United States Patent [19]

Hasson et al.

[11] 4,114,113

[45] Sep. 12, 1978

[54] LASER AND ITS METHOD OF OPERATION

[75] Inventors: Victor Haim Hasson; Hubertus Michael von Bergmann, both of Pretoria, South Africa

[73] Assignee: The South African Inventions Development Corporation, South Africa

[21] Appl. No.: 692,085

[22] Filed: Jun. 2, 1976

[30] Foreign Application Priority Data

Jun. 3, 1975 [ZA] South Africa .................. 75/3563

[51] Int. Cl.$^2$ .................................................. H01S 3/00
[52] U.S. Cl. ........................ 331/94.5 G; 331/94.5 P; 331/94.5 PE
[58] Field of Search ................ 331/94.5 G, 94.5 P, 331/94.5 PE

[56] References Cited

U.S. PATENT DOCUMENTS

| | | | |
|---|---|---|---|
| 3,696,307 | 10/1972 | Beaulieu | 331/94.5 |
| 3,876,958 | 4/1975 | Parker | 331/94.5 G |
| 3,886,479 | 5/1975 | Pearson | 331/94.5 G |
| 3,986,139 | 10/1976 | Meneely | 331/94.5 P |

OTHER PUBLICATIONS

Willet, Introd. to Gas Lasers:Population Inversion Mechanisms, Pergamon Press, N.Y., 1964.
Hasson et al., Appl. Phys. Letters, vol. 25, No. 11, 1 Dec. 1974.
Bergmann et al., Appl. Phys. Letters, vol. 27, No. 10, 15 Nov. 1975.

*Primary Examiner*—Martin H. Edlow
*Attorney, Agent, or Firm*—Ladas, Parry, Von Gehr, Goldsmith & Deschamps

[57] ABSTRACT

This invention relates to transversely-excited gas lasers, in which the gas may be at atmospheric or greater pressure and in which the gas is excited by means of a distributed electric discharge between two electrodes. The electrodes, which are preferably elongate, are such that an initial trigger discharge occurs between minor trigger portions of the electrodes which conditions the discharge gap between the electrodes resulting in a distributed, preferably glow-type discharge, between the major portions of the electrodes causing lasing action in the gas. The trigger discharge preferably generates electro-magnetic radiation of high intensity to cause volume photo-ionization of the gas. The electrodes may be composite in form, each having a trigger electrode and a main discharge electrode that are directly electrically connected to each other.

24 Claims, 8 Drawing Figures

LASER AND ITS METHOD OF OPERATION

FIELD OF THE INVENTION

This invention relates to a laser and to a method of generating lasing action in a laser. It relates more particularly to transversely excited lasers which may be operated at atmospheric, or higher, pressures.

SUMMARY OF THE INVENTION

According to the invention there is provided a transversely excited gas laser, which includes:

two discharge electrodes that are spaced apart to define between them a lasing gap;

means for immersing the electrodes in a lasing gas; and connecting means for electrically connecting the electrodes to a source of electrical power;

with the electrodes being shaped so that a major portion of both electrodes generate a lowly stressed electric field and a minor, trigger portion of at least one of the electrodes generates a relatively highly stressed electric field, such that when a suitable potential difference is established between the electrodes, an initial trigger discharge occurs between the trigger portion of the said electrode and the other electrode to cause breakdown and a distributed main discharge between the major portions of the two electrodes, such that lasing action occurs in the gas located in the lasing gap.

Further according to the invention there is provided a method of exciting a gas located in a lasing gap between two electrodes into lasing action comprising:

discharging an electrical trigger discharge between a minor trigger portion of one of the electrodes and the other electrode to cause breakdown of the gas in the lasing gap so that a main, distributed electrical discharge occurs between the major portion of the said electrode having the trigger portion and the other electrode, thereby exciting the gas.

The electrode having the trigger portion may be shaped so that the rate of curvature of the trigger portion is substantially greater than the maximum rate of curvature of the major portion of the electrode. In order to cause breakdown of the gas, the electrodes may be shaped and separated from each other such that the trigger discharge causes large scale ionization of the gas in the lasing gap.

In a preferred embodiment, the electrode having the trigger portion may be in the form of a composite electrode comprising a main discharge electrode and a trigger electrode that are directly electrically connected to each other.

Two trigger electrodes may conveniently be provided, each of the trigger electrodes being directly electrically connected to one of the main electrodes. With this arrangement, the trigger discharge may be between the two trigger electrodes. Accordingly, the geometry of the electrodes may be such that the breakdown voltage between the two trigger electrodes is lower than the breakdown voltage between the two main electrodes. Preferably the separation of the trigger electrodes may be 20%-40% greater than that of the main electrodes.

The geometry of the trigger electrodes may be such that they generate an electric field having relatively high value local stress regions in the vicinity of these electrodes, such that the trigger discharge is of the corona type. On the other hand, the geometry of the main electrodes may be such that they generate a uniform or quasi-uniform electric field. Accordingly, the trigger electrode may be sharpened, whereas the main electrodes may be rounded. The main electrodes may conveniently have a Rogowski cross-sectional profile. The trigger electrodes may conveniently be adapted to provide a corona type discharge, whereas the main electrodes may be adapted to provide a glow type discharge.

The electrodes may be arranged such that the dynamic resistance of the trigger discharge is greater than that of the main discharge. It is understood that this may be obtained by varying the respective widths of the trigger and main discharge gaps. By this means, an initial high trigger current may be drawn from a suitable high voltage source, a substantial portion of this current being transferred to flow between the main electrodes once the main discharge has been established.

The geometry of the electrodes may further be such that the trigger discharge diminishes or ceases entirely once the main discharge has been established. Alternatively the electrode geometry may be such that the trigger discharge does not cease altogether, such that the trigger discharge not only initiates the main discharge but also stabilizes and sustains the main discharge.

The trigger discharge may initiate the breakdown between the main electrodes by perturbing the electric fields between the main electrodes, by irradiating the main discharge gap with electrons and/or by irradiating the gas in the main discharge gap with electro-magnetic radiation thereby to cause large-scale photo-electric emission of electrons in the main discharge gas. Preferably, the trigger discharge may be adapted to cause volume photo-electric emission in the discharge gap.

By "photo-electric emission" is meant the excitation of an atom by electro-magnetic stimulation to emit an electron. The electrons may accordingly be emitted from atoms of gas or from atoms of the solid material within or defining the chamber.

The electro-magnetic radiation may have sufficient quantum energy to cause photo-electric emission. Accordingly, the trigger discharge may be adapted to generate electro-magnetic radiation in the ultra-violet region of the visible spectrum, or to generate radiation having a frequency higher than that of ultra-violet light. The radiation may be of sufficient intensity to generate an electron density of greater than $10^4$ electrons/cm$^3$ in the main discharge gap. The intensity of the radiation generated by the trigger discharge may be enhanced by providing the discharge across the surface of a suitable insulating material, for example a suitable ceramic. By this means, a main discharge having a formation time of the order of nano-seconds may be provided.

The laser may be supplied with power from a suitable high voltage source. The laser may be operated in a pulsed mode, utilising a suitable switching means. Alernatively, the laser may be operated in a continuous mode. The laser may further be operated below, at, or substantially above the breakdown voltage of the main electrodes. Preferably, however, the laser may be operated at a substantially over-volted mode. Naturally, the voltage supplied to the electrodes will be greater, preferably substantially so, than the breakdown voltage of the trigger discharge. In order to ensure efficient operation of the laser, the voltage pulse supplied to the electrodes may have a rise time of less than ten nanoseconds.

The electrodes may be housed in a suitable housing, which has a transparent window or aperture through which the laser beam may be emitted. Openings may be provided in the housing for introducing and removing the lasing gas. The laser may further have an optical resonator within or external to the housing.

The electrodes may be of any suitable material such as copper, stainless steel, aluminium, carbon, or the like. The trigger electrodes and the main electrodes may be of the same or different materials. The trigger electrodes and the main electrodes may further be discrete electrodes, the trigger electrodes and the main electrodes being electrically connected by suitable means. Conveniently, the trigger electrodes and the main electrodes may be in intimate mechanical and electrical contact with one another. Alternatively, each trigger electrode and main electrode combination may be shaped from one piece of metal.

The lasing gas may be substantially below, at, or above atmospheric pressure. The gas may further be continuously purged, with fresh gas being introduced and removed through the openings provided in the housing. Conveniently, the gas may be air, nitrogen, hydrogen, helium, xenon, argon, krypton, carbon dioxide, or any other suitable desired gas; or a mixture of gases. Additives may further be added to the gas, in order to enhance the photo-electric emission of the electrons.

The main electrodes may be elongate in form to define an extended gap. Similarly, the trigger electrodes may also be elongate. The electrodes may be continuous, or they may be segmented.

By this means, ultra-violet or other type lasers may be provided which can operate at high pressures at nanosecond or even longer time scales, with high specific and total energy input capabilities. Further, as the discharge switches automatically into a glow mode of operation when the trigger discharge has attained a sufficient intensity, the separation of the main electrodes and other parameters is not critical. It is accordingly not necessary to regularly adjust the separation of the trigger electrodes and of the main electrodes. Still further, although the trigger electrodes have a high initial energy drain, this is for a very short time period, and there is accordingly very little deterioration of the trigger electrodes allowing for long life operation. Further, as the discharge between the main electrodes is of the glow type these electrodes also have a long life.

BRIEF DESCRIPTION OF THE DRAWINGS

The invention will now be described, by way of examples, with reference to the accompanying drawings, in which.

DESCRIPTION OF ILLUSTRATIVE EMBODIMENTS

Figure 1:
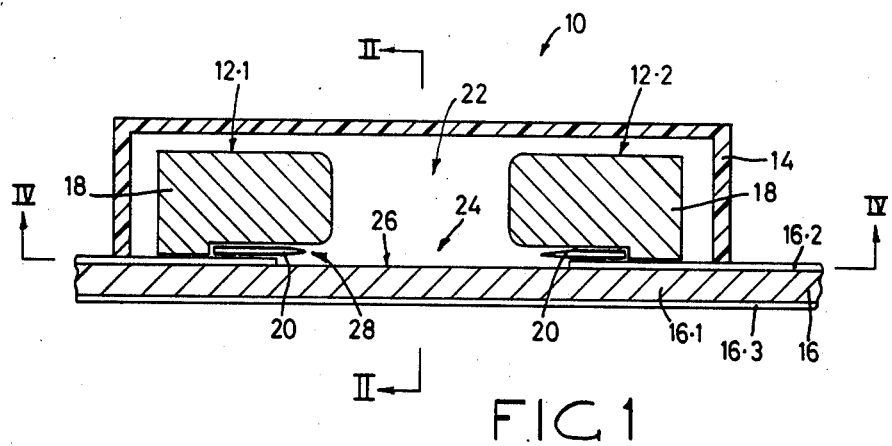
FIG. 1 shows a transverse sectional view of one embodiment of a laser in accordance with the invention.
Figure 2:
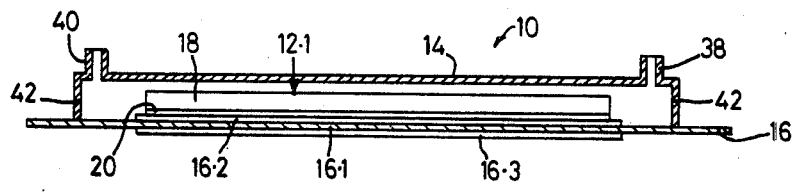
FIG. 2 shows a longitudinal sectional view of the laser of FIG. 1, along line II—II in FIG. 1.
Figure 3:
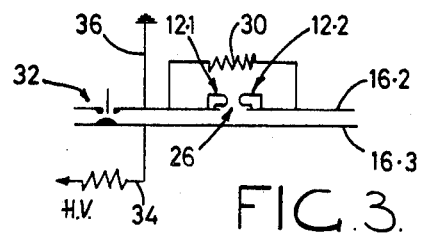
FIG. 3 shows a schematic circuit diagram of the Blumlein-type power circuit used to energize the laser of FIGS. 1 and 2.

Referring initially to FIGS. 1, 2 and 3, a transversely excited nitrogen laser is shown generally by reference numeral 10. The laser 10 has two composite spaced apart electrodes 12.1 and 12.2 housed in a gas tight, perspex housing 14 mounted on a copper clad circuit board 16.

The composite electrodes 12.1 and 12.2 each comprise a smoothly contoured, aluminium, main electrode 18 and a strip of steel razor blade, which constitutes a trigger electrode 20. All of the electrodes 18 and 20 are elongate, with a length of 25cm, as shown in FIG. 2. The main electrodes 18 are spaced apart a distance of 3mm, to define a main discharge gap 22, and the trigger electrodes 20 are spaced apart 4mm to define a trigger discharge gap 24. The main electrodes 18 and the trigger electrodes 20 are in intimate mechanical and electrical contact with one another.

The circuit board 16 is of the conventional type, comprising a substrate 16.1 of an electrically insulating material, copper layers 16.2 and 16.3 being secured to both sides thereof. The circuit board 16 is 60cms long by 30cms wide, the electrodes 18.1 and 18.2 being located across the width thereof. The copper layers 16.2 and 16.3 thus form a capacitor having a capacitance of about 3.5nF.

A strip 26 of copper 6mm wide is etched away from the copper layer 16.2, across the width of the circuit board 16, about 20cm from one end. The two composite electrodes 18.1 and 18.2 are secured to the two edges of the copper layer 16.2 on either side of the strip 26, with the main electrodes 18 and the trigger electrodes 20 in intimate mechanical and electrical contact with the copper layer 16.2. Each main electrode 18 has a recess 28, the trigger electrodes 20 being located in these recesses between the main electrodes 18 and the circuit board 16.

The two portions of the copper layer 16.2 are electrically connected together by a charging resistor 30, a triggered spark discharge switch 32 is provided between the copper layers 16.2 and 16.3, and connecting cables 34 and 36 are provided to charge the capacitor formed by the two copper layers 16.2 and 16.3 from a suitable high voltage source, to constitute a Blumlein-type power supply, as is shown in FIG. 3.

The perspex housing 14 has an inlet port 38 at one end and an exhaust port 40 at the other end. Quartz windows 42 are also provided at either end of the housing 14 about the axis of symmetry of the electrodes 12.1 and 12.2. It will be appreciated that one of the windows 42 could be replaced by a mirror and that an optically resonant cavity could be provided by replacing the windows 42 with a totally reflecting and a partially reflecting mirror.

In operation, the housing 14 is purged of air and filled with nitrogen to which trace levels of a photo-ionizable additive, triethylamine, are added, to a pressure of 1 bar. The copper layers 16.2 and 16.3 are charged to a voltage of 40KV ad the laser operated by firing the switch 32, resulting in a voltage pulse haing a rise time of about three nano-seconds being applied across the electrodes 12.1 and 12.2. Due to the shape of the main electrodes 18 and the trigger electrodes 20, a relatively high stressed field is created in the trigger discharge gap 24 and a less stressed field in the main discharge gap 22. The spacing of the main discharge electrodes 18 and the trigger electrodes 20 is such that both the trigger discharge gap 26 and the main discharge gap 24 have a breakdown voltage substantially below 40KV, with the breakdown voltage of the trigger discharge gap 26 being less than that of the main discharge gap 22. As a result a trigger discharge occurs between the trigger electrodes 20, across the strip 26 of exposed surface of the substrate 16.1. This trigger discharge is of a distributed corona type which generates ultra-violet light that irradiates the main discharge gap 22 causing large scale volume photo-electric emission of electrons from the surfaces of the main electrodes 18, in the nitrogen in the main discharge gap 22 and from the traces of triethylamine. This results in an electron density of greater than $10^4$ electron/cm$^3$, breakdown of the main discharge gap 22 and a distributed glow-type discharge between the main electrodes 18, causing energy state inversion of the nitrogen and lasing action. As the main discharge electrodes 18 are closer together than the trigger electrodes 20, and as the cross-sectional area of the main discharge is greater than that of the trigger discharge, the trigger discharge has a much greater dynamic resistance than that of the main discharge. As a result, once the main discharge has been initiated, a substantial portion of the current flowing in the trigger discharge is transferred to the main discharge. The loop inductance of the main discharge is thus relatively low and the main discharge is relatively fast, providing a laser pulse of the order of one nano-second duration. Further, as the trigger discharge decays once the main discharge has been initiated, it is a low energy discharge. The pulse has an energy of approximately 1 milli-Joule, providing beam power in the region of 1MW and more.

Figure 4:
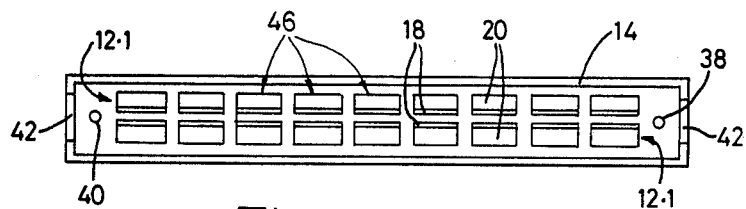
FIG. 4 shows an underneath sectional plan view of a further embodiment of a laser in accordance with the invention. This embodiment is similar to that of FIGS. 1 and 2 and the view shown is as indicated by the lines IV—IV in FIG. 1.

Referring now to FIG. 4, a further embodiment of a laser in accordance with the invention is shown, referred to generally by numeral 10.1. This laser 10.1 is very similar to the laser 10 of FIGS. 1 and 2, except that the composite electrodes 12.1 and 12.2 are segmented into segments 46. Each segment 46 however has the same configuration as with the previous embodiment, and the laser 10.1 is similarly referenced. The operation of this laser 10.1 is similar to that previously described.

Finally, reference is made to FIGS. 5, 6, 7 and 8. In these Figures, various different forms of electrode configurations are shown.

Figure 5:
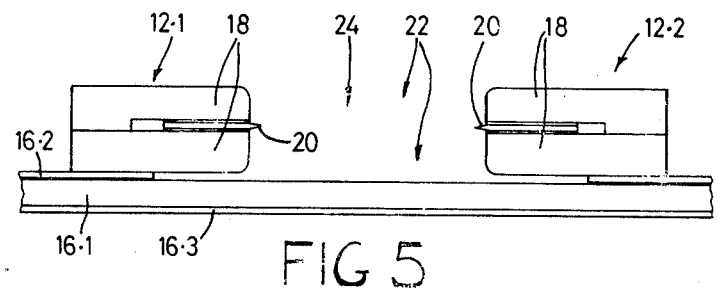
FIGS. 5, 6, 7 and 8 show transverse views of four other electrode structures for lasers in accordance with the invention.

In FIG. 5, composite electrodes 12.1 and 12.2 are shown, each having a non-stressed main electrode 18 and a highly-stressed trigger electrode 20. The composite electrodes 12.1 and 12.2 are formed from more than one piece of material. With this embodiment the trigger electrodes 20 are closer together than the main electrodes 18 and thus the corona trigger discharge does not diminish appreciably, initiating and sustaining the main discharge.

Figure 6:
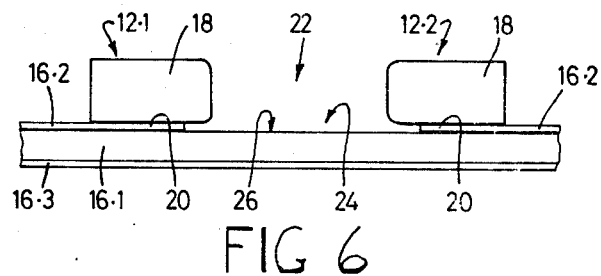

The electrode configuration shown in FIG. 6 is very similar to that of FIGS. 1 and 2, except the trigger electrodes 20 are formed by the copper layer 16.2 on either side of the strip 26. The trigger discharge takes place between the edges of the copper layer 16.2.

Figure 7:
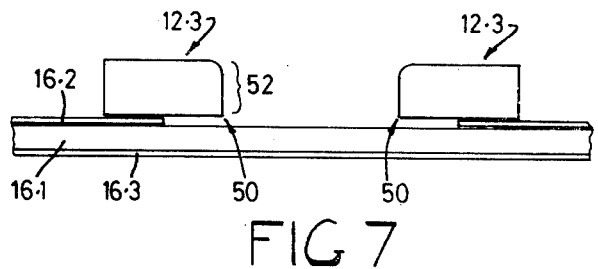

An alternative unitary electrode configuration is shown in FIG. 7. This embodiment has two unitary electrodes 12.3. Each electrode 12.3 is smoothly contoured except along one edge 50 which is angular having a relatively high curvature. These angular edges 50 form trigger portions, the remaining major portions 52 being the main discharge portions. Thus, with this embodiment an initial trigger discharge occurs between the angular edges 50, causing breakdown and a distributed discharge between the major portions 52 of the electrodes 12.3.

Figure 8:
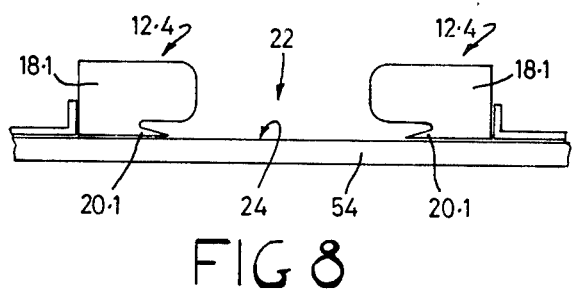

A further composite electrode configuration is shown in FIG. 8. Two composite electrodes 12.4 are shown, each formed from one piece of aluminium. Each electrode 12.4 has a sharpened trigger electrode 20.1 and a main discharge electrode 18.1 which has a Rogowski cross-sectional profile. These two electrodes 12.4 are mounted on a ceramic substrate 54, with the trigger electrodes 20.1 in contact with the substrate, such that the trigger discharge occurs across the surface of this ceramic substrate.

We claim:

1. In a transversely excited gas laser which includes two main discharge electrodes that are rounded to generate a quasi-uniform electric field such that a lasing glow discharge occurs between them and are spaced apart to define between them a lasing gap; two trigger discharge electrodes, at least one of which is sharpened so that a corona discharge occurs between the two trigger discharge electrodes, the trigger discharge electrodes being in close proximity to the lasing gap and being spaced apart to define a trigger discharge gap; a means for immersing the main discharge electrodes and the trigger discharge electrodes in a gas; and connecting means for electrically connecting the main discharge electrodes and the trigger discharge electrodes to a high voltage pulse generating means; the improvements comprising:

each of the two trigger electrodes being directly electrically connected to a different one of the main discharge electrodes;

the breakdown voltage of the trigger electrodes being less than that of the main electrodes; and the impedance between the trigger electrodes when a trigger corona discharge occurs between them being greater than the impedance between the main electrodes when a lasing glow discharge occurs between the said main discharge electrodes.

2. A laser as claimed in claim 1, in which the trigger discharge electrodes are spaced apart a distance such that the length of the trigger corona discharge is greater than that of the lasing glow discharge.

3. A laser as claimed in claim 1, including the further improvement comprising an impedance and radiation enhancing member positioned across the trigger discharge gap such that a surface corona discharge occurs across a surface of the member between the trigger discharge electrodes.

4. A laser as claimed in claim 2, in which the separation of the trigger discharge electrodes is greater than 120% that of the main discharge electrodes.

5. A laser as claimed in claim 1, in which the main discharge electrodes have a Rogowski cross-sectional profile.

6. A laser as claimed in claim 3, in which the impedance and radiation enhancing member is of a ceramic material.

7. A laser as claimed in claim 1, in which both of the trigger electrodes are sharpened.

8. A laser as claimed in claim 1, in which at least one of the main discharge electrodes and its associated trigger discharge electrode are formed from one piece of material.

9. A laser as claimed in claim 1, in which at least one of the main discharge electrodes and its associated trigger discharge electrode are formed from separate pieces of material and are in intimate mechanical and electrical contact with each other.

10. A laser as claimed in claim 1, in which the main discharge electrodes are of a material selected from the group consisting of copper, stainless steel, aluminum, nickel, carbon and any mixture thereof.

11. A laser as claimed in claim 1, in which the main discharge electrodes and the trigger discharge electrodes are elongate and of substantially equal length.

12. A laser as claimed in claim 1, in which the main discharge electrodes and the trigger discharge electrodes are segmented along their lengths.

13. A laser as claimed in claim 1, in which the means for immersing the main discharge electrodes and the trigger discharge electrodes in the gas comprises a gas tight housing having a transparent window for laser beam passage.

14. A laser as claimed in claim 13, in which the pressure of the gas in the housing is greater than 5 pounds per square inch.

15. A laser as claimed in claim 1, which includes a high voltage pulse generating means connected to the main discharge electrodes and the trigger discharge electrodes by the connecting means.

16. A laser as claimed in claim 15, in which the high voltage pulse generating means has a low impedance.

17. A laser as claimed in claim 15, in which the high voltage pulse generating means supplies a voltage pulse of a substantially greater magnitude than the breakdown voltage of the trigger discharge electrodes.

18. A laser as claimed in claim 3, in which the radiation enhancing member is planar and which includes a planar return conductor, the radiation enhancing member being located between the return conductor and the trigger discharge electrodes.

19. A laser as claimed in claim 1, in which the gas is selected from the group consisting of oxides of carbon, nitrogen and its oxides, hydrogen, rare gases, halides and their compounds, metal vapors and their compounds, any mixture thereof, and any compound thereof.

20. A method of exciting a gas located in a lasing gap between two main discharge electrodes into lasing action, comprising
applying a high voltage pulse to the main discharge electrodes and simultaneously to two trigger discharge electrodes that are each directly electrically connected to a different one of the main discharge electrodes;
discharging a trigger current through the trigger electrodes to cause a distributed corona discharge between the trigger discharge electrodes to cause breakdown of the gas in the lasing gap; and
discharging a laser current through the main discharge electrodes to cause a distributed main glow discharge between the main discharge electrodes which discharge has an impedance that is less than that of the trigger corona discharge, such that a major portion of the current supplied to the main discharge electrodes and the trigger discharge electrodes flows through the main glow discharge.

21. A method as claimed in claim 20, in which the voltage pulse has a rise time of less than ten nanoseconds.

22. A method as claimed in claim 20, in which the voltage pulse has a magnitude substantially greater than the breakdown voltage of the trigger discharge electrodes.

23. A method as claimed in claim 20, in which the trigger discharge occurs across a surface so as to be of the surface corona type.

24. A method as claimed in claim 20, in which the length of the trigger discharge is greater than that of the main glow discharge.

* * * * *